United States Patent [19]

Earp

[11] Patent Number: 5,802,013
[45] Date of Patent: Sep. 1, 1998

[54] MOBILE SENSOR FOR GROUND PENETRATING SONAR

[75] Inventor: Ronald Lee Earp, Burlington, N.C.

[73] Assignee: Lucent Technologies Inc., Murray Hill, N.J.

[21] Appl. No.: 871,159

[22] Filed: Jun. 9, 1997

[51] Int. Cl.⁶ .................. H04R 1/28; G01V 1/16
[52] U.S. Cl. .................. 367/178; 181/122; 181/401
[58] Field of Search .................. 367/178; 181/122, 181/401; 73/632, 635, 639, 645, 644

[56] References Cited

U.S. PATENT DOCUMENTS

| | | | |
|---|---|---|---|
| 3,301,345 | 1/1967 | Carder | 181/401 |
| 3,762,496 | 10/1973 | Milberger et al. | 73/649 |
| 4,027,753 | 6/1977 | Lantz | 188/181 R |

Primary Examiner—Ian J. Lobo

[57] ABSTRACT

A cart-mounted acoustic transmitter and receiver system for echo-locating underground structures, such as piping. A transmitting transducer, mounted in a non-resonant tube and positioned adjacent to the ground, directs sound waves downwardly through an air column while a receiving transducer, rolling over the ground, picks up echoes returned from buried objects. The rolling transducer includes a piezo-electric transducer mounted in a tubular plastic axle on which an elastomeric disc rotates making contact with the ground. A pair of port and starboard rolling transducers provide inputs to a differential amplifier to enhance detection by increasing discrimination against the return from the benign land mass.

9 Claims, 2 Drawing Sheets

5,802,013

MOBILE SENSOR FOR GROUND PENETRATING SONAR

FIELD OF THE INVENTION

This invention relates to echo location and more particularly to the use of sound waves to locate underground objects.

BACKGROUND OF THE INVENTION

Much work has been done in both terrestrial and oceanic seismography in which reflections of acoustic waves (such as occur when incident acoustic waves strike an object of different density than the medium in which the wave is traveling) are analyzed to discern, identify and classify targets of interest. The sonar "ping" is a familiar example of a simple echo location system that may employ a circumnavigational wave for detecting undersea objects. In my prior U.S. Pat. No. 5,025,423, issued 18 Jun. 1991, I disclose a more sophisticated system, commercially known as the Enhanced Bottom Sonar System or EBSS. The EBSS identifies objects on the ocean floor by launching bursts of acoustic wave energy at different frequencies, collecting the reflected signals, and comparing the collected data with a library of data sets, each set corresponding to the back-scatter energy of a particular type of object. However, this system requires an array having as many as 25 transmitting transducers, which makes it too unwieldy for locating shore-based underground objects such as utility pipes. My co-pending provisional application entitled "Ground Penetrating Sonar", Ser. No. 60/015,859 filed Jul. 8, 1996 discloses a parametric transmitting transducer which, advantageously can launch a near-field, narrow acoustic beam with negligible side lobes using just a single parametric transducer. It would be extremely advantageous to further improve the last mentioned system by permitting the continuous reception of echoes as the receiver is moved over the ground.

SUMMARY OF THE INVENTION

The foregoing and other objects of the present invention are achieved in the illustrative embodiment in which echoes from insonified underground objects are picked up by a mobile receiving sensor. In the illustrative embodiment, a rolling disk of elastomeric material, illustratively silicone rubber, is placed into continuous contact with the ground as the sensor is moved over the land mass. The silastic disk is rotatably mounted on a hollow axle advantageously made of polyvinyl chloride ("PVC") pipe. The rotational clearance between the outside diameter of the axle and the inside diameter of the disk is lubricated, advantageously with a jelly lubricant such as petroleum jelly (e.g., "Vaseline"), to reduce air gaps. A transducer assembly including a ceramic piezoelectric pickup and pre-amplifier is mounted within the hollow axle adjacent to the rolling disk. Any gaps between the assembly and the interior axle wall are filled with petroleum jelly or castor oil. For enhanced detection of piping buried under covering materials such as concrete and asphalt, and to increase discrimination against the return from the benign land mass which has no buried piping, a similar rolling transducer may be provided on the opposite side of the cart, the two transducers providing inputs to a differential amplifier.

DESCRIPTION OF THE DRAWING

The foregoing objects and features may become more apparent when the ensuing description is read together with the drawling in which.

GENERAL DESCRIPTION

Figure 1:
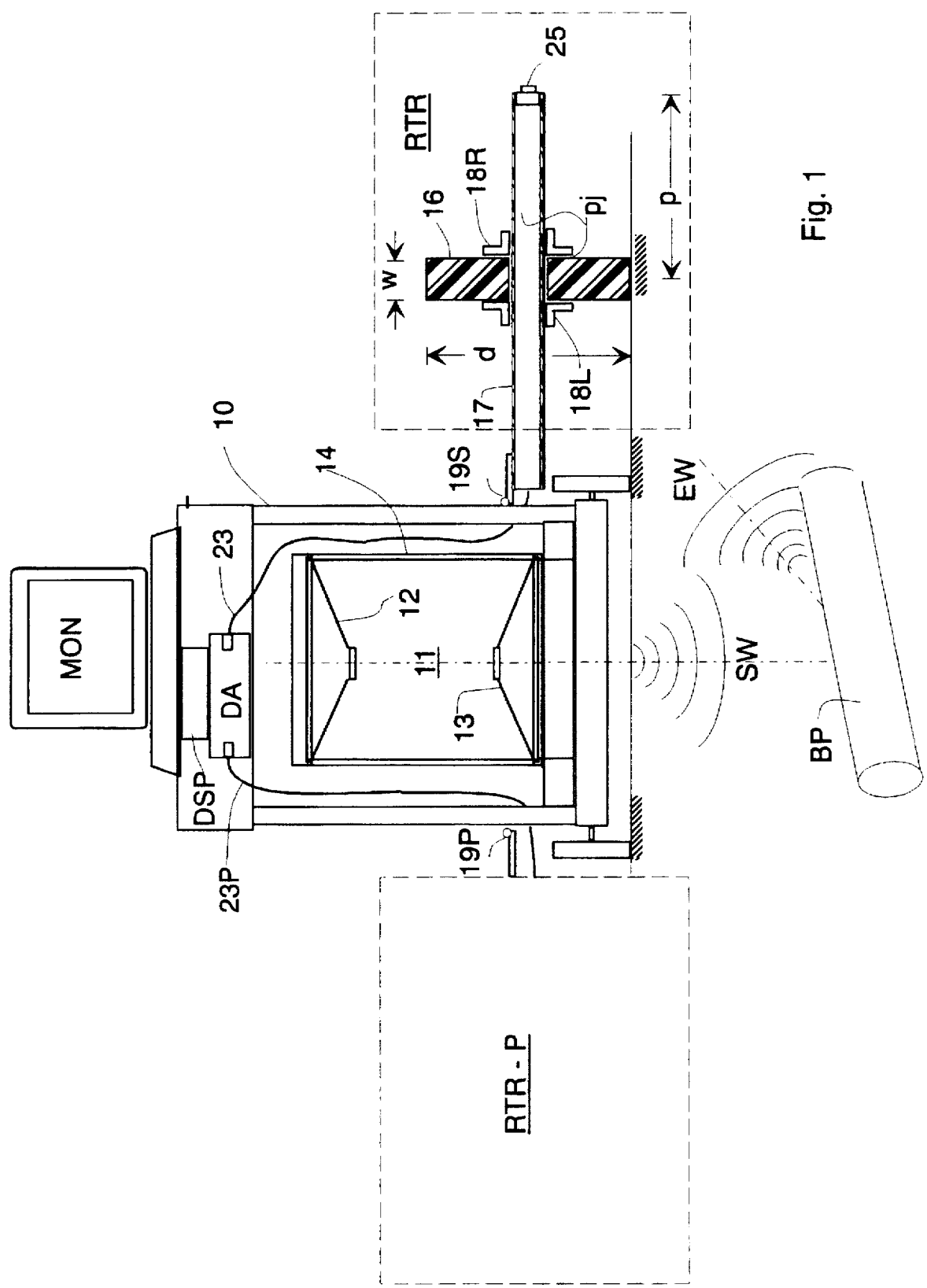
FIG. 1 shows a sonar cart having a rolling transducer receiver illustrating the principles of the present invention.

Referring to FIG. 1, there is shown a wheeled sonar cart 10 having an air-coupled acoustic transmitter 11 for launching sound waves SW into the ground for the purpose of locating buried structures such as buried pipe BP and having a rolling transducer receiver RTR for detecting the returning echo wave EW. A pair of high power loudspeakers 12, 13 are provided. They are advantageously of a type commonly used for damp locations and preferably have plastic water-resistant cones. Loudspeakers 12, 13 are mounted in a non-resonant tube 14. Acoustic energy is coupled from the transmitting tube into the land mass via the intermediate air column below tube 14. To obtain the best positioning of the loudspeakers within tube 14, a microphone (not shown) was buried in the ground and one of the loudspeakers was first mounted approximately one-quarter wavelength from the land mass end of tube 14 to form a resonant transmitter at the frequency of the generated sound wave in air. Waves emitted from the rear of the speaker progressed to the opposite end of tube 14 where they were reflected with sufficient phase shift so as to arrive again at the rear surface of the speaker with reinforcing phase. The second speaker was then located within tube 14 at a position to maximize return from the buried microphone when the speakers were driven 180° out of phase with one another.

In the illustrative embodiment, tube 14 is a soft fiber mesh tube having an inside diameter of 10 inches (25.4 cm). Loudspeakers 12, 13 are driven 180° out of phase with each other by a power amplifier (not shown). This amplifier is advantageously operated in switched class D mode to drive the speakers with short high level bursts of broadband energy. In the illustrative embodiment 80 watt speakers were employed. To provide linear drive, the power amplifier employed reactive energy storage components (not shown) to improve efficiency. The end of transmitting tube 14 was positionable at a height of from 1.5 to 2.5 inches (3.8 to 6 cm) above ground, depending on the surface features of the terrain over which the cart 10 was moved. By employing short transmitted bursts, it was possible to minimize the delay between the trailing edge of the transmitted pulse and the opening of the receiver gate. This reduced the chances of missing a return echo from a nearby underground pipe, which might arrive after only a very short delay.

Rolling receiving transducer RTR comprises a rolling silastic disk 16 rotatably mounted on a hollow axle 17 between flanges 18L and 18R. Hollow axle 17 and flanges 18 are advantageously made of PVC material. Receiving transducer RTR includes an assembly 20 comprised of a ceramic piezoelectric hydrophone pickup 21 and pre-amplifier 22 mounted at the end of an electrical cable 23 within hollow axle 17. For simplicity of the drawing, only the right hand (starboard) rolling receiver transducer RTR is shown in detail. However, an identical rolling transducer apparatus RTR-P is also advantageously provided at the opposite side of cart 10. The use of both port and starboard rolling transducer receivers improves the overall signal-to-noise ratio. Moreover, the pair of rolling transducer receivers are advantageously connected to provide their received signals to a differential amplifier DA in order to null-out the response to the benign land mass (where no pipes are present). The signals from differential amplifier DA are applied to a digital signal processor DSP and displayed in appropriate format such as "waterfall" on monitor MON. (The waterfall display mode is described below). When the presence of a pipe produces echoes, the amplifier provides a high gain to the differential signals, especially where the pipe is located under covering materials such as concrete and asphalt. Differential preamplifier gain of approximately 50 to 80 dB is desirable.

Figure 2:
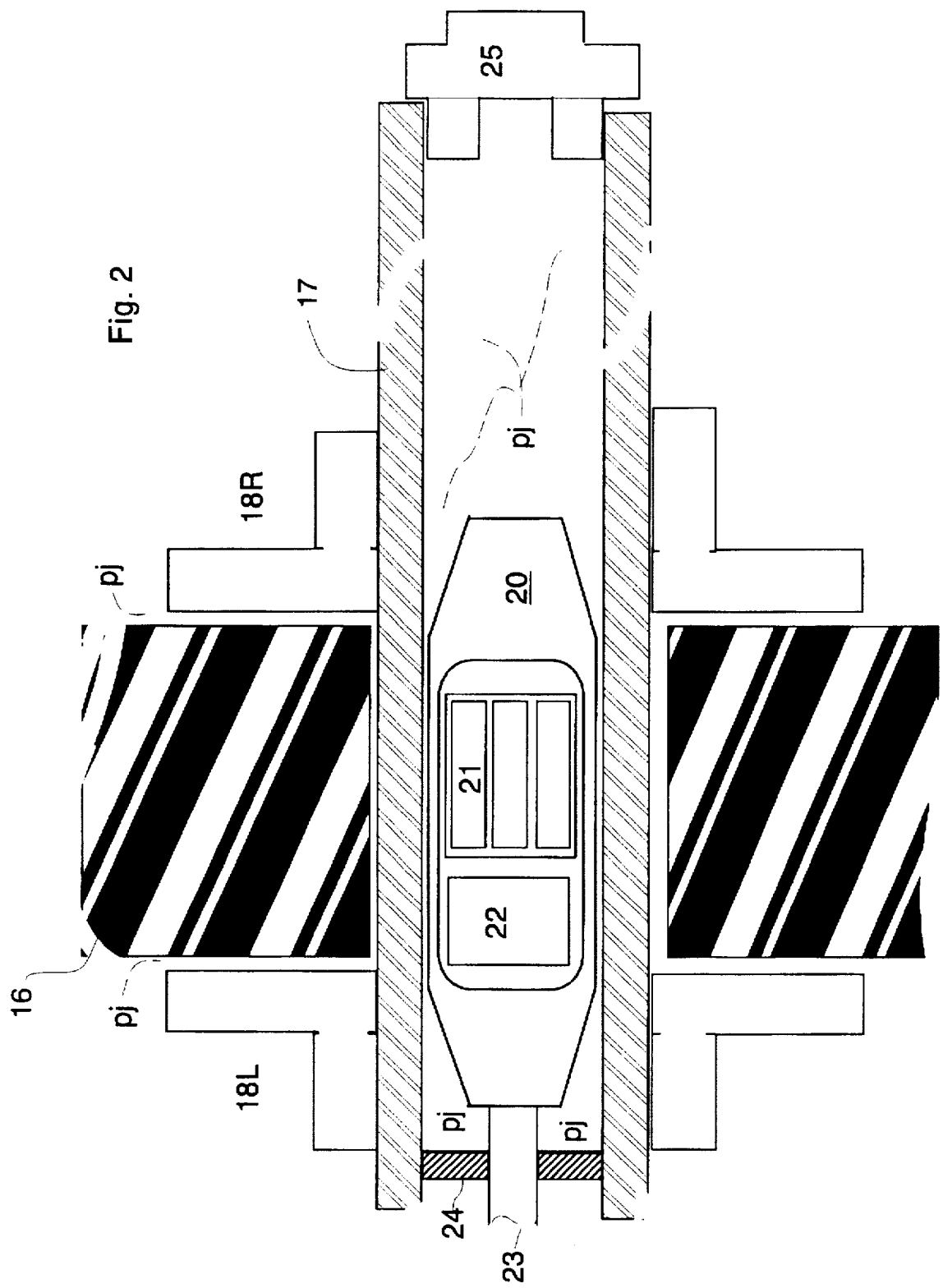
FIG. 2 shows the interior details of the axle housing the rolling transducer.

Referring now to FIG. 2, the details of how the ceramic transducer, assembly 20 is mounted within hollow axle 17 are shown. Flanges 18L and 18R define in the longitudinal space between them the location of rotating disk 16 along axle 17. As noted, the faces of flanges 18L, 18R facing disk 16 and the interior diameter of disk 16 are copiously lubricated with petroleum jelly. In addition, the interior of axle 17 between left axle seal 24 and plug 25 at the right-hand end of axle 17 is filled with petroleum jelly pj (or with castor oil) to prevent the formation of any air gaps between transducer assembly 20 and the interior walls of axle 17. In practice, transducer assembly 20 is inserted into the grease-filled interior of axle 17, cable 23 is threaded through axle seal 24, additional grease is inserted, and finally plug 25 is threaded into the end of axle 17 to expel the last bit of air.

Chirp techniques are generally useful to resolve the echo returned by small diameter pipes buried at depth. These techniques allow the operator to choose a transmitter pulse from a minimum value of approximately 2 kHz to a maximum value of approximately 10–14 kHz. When the echo signal is processed, all frequency components are summed to approximate an impulse, that is, a pulse of very short duration and high amplitude. This technique allows the operator to use a lengthy transmitter waveform which will support high resolution detection methods, yet allow the detection of pipes lying very close to the transmitter and receiver (i.e., where travel times for the pulse to reach the target and be returned to the receiver are short).

EXAMPLE 1

The silastic material employed in rotating disk 16 was a silicone polymer elastomer commercially known as Dow Corning "SYLGUARD 184" available in the form of a two-part kit of liquid ingredients. When the base and curing agent are mixed in a 10:1 weight ratio the medium viscosity liquid mixture has consistency resembling SAE 40 motor oil. The mixture cures to a flexible, transparent elastomer. This elastomer is well-suited for forming an elastic wheel flexible enough to conform to the land mass, yet high enough in tear strength to resist shredding by surface irregularities.

The DSP illustratively supplies three fundamental types of drive to transducer T, namely: (a) chirp drive, (b) time series drive or (c) frequency domain drive. The chirp drive provides a waveform that incrementally increases in frequency to allow the user to determine the best set of operating frequencies for the particular geophysical conditions encountered. While lower frequencies tend to penetrate the ground with less attenuation than higher frequencies, they afford less spatial resolution. Analysis of the data returned will normally show a maximum of signal-to-noise ratio over some narrow band of frequencies. The chirp drive is definable by setting a number of parameters such as the base or initial frequency upon which the chirp is based, illustratively 225 Hz; the sample frequency which assigns the sample rate for the analog to digital converter, illustratively, 61.4 kHz; the amplitude parameter which sets the desired peak to peak amplitude of the chirp output waveform; the step frequency which determines the frequency increment from the initial starting frequency to each successive output frequency; and the number of steps, illustratively 0 to 200, which determines how many increments in frequency are to be output. The time series drive generates a transmitted pulse of energy at, illustratively 10 kHz, for a short time interval, illustratively, about 0.8 to 2.28 msec; gates on the receiving amplifier for a specified time interval; correlates the returned echo signal with the original transmitted waveform; smooths the data with a moving average block function and displays the results to the operator. In a typical process sequence for echo collection, the transducer is first placed at a point on the ground and energized with predetermined duration bursts at the primary frequencies. A receiving transducer is used to pick up the echoes.

Data from a sequence of echo returns may be displayed in the "waterfall" mode in which the oldest sequence of echo signals appears on the computer screen in the upper right hand portion and the newest in the lower left hand portion. After analyzing the "waterfall" pattern of the received signals, the process is repeated at other points on the ground. When the transducers are moved into an area over a particular kind of underground structure, such as a buried pipe, a change in the waterfall display will be seen due to the acoustic signal reflected by the pipe. Initially the surface acoustic wave is detected. However, when the apparatus is directly over a buried pipe, the return echo arrives at the rolling transducer receiver out of phase with the surface wave and effectively reduces the received signal.

What has been described is deemed to be illustrative of the principles of the invention. For example, the illustrative apparatus employed 80-watt "pool side" loudspeakers as the transmitting transducer. These were found to be adequate for insonifying objects buried to a depth of about 3 feet. Higher levels of insonification of the land mass would be beneficial in locating objects buried deeper than about 3 feet (1 meter). An increase in transmitter power levels of about 6 dB may be obtainable, e.g., by a direct contact transducer mechanism (NOT SHOWN) instead of one positioned at some elevation above the ground. Numerous other modifications will be apparent to those skilled in the art without however departing from the spirit and scope of the invention.

What is claimed is:

1. A rolling acoustic transducer for detecting echoes from insonified buried objects comprising: a substantially cylindrical body of elastomeric material providing a substantially uniform acoustic transmission medium, said body being rotatably mounted on a hollow axle and a piezoelectric pickup mounted within said axle, the rotational clearance between the inside diameter of said body and the outside diameter of said, axle and the interior of said hollow axle being filled with a lubricant to exclude air gaps, the characteristic impedance of said elastomeric material being adapted to form an approximate match between the characteristic impedance of said piezoelectric pickup and the characteristic impedance of the ground.

2. A rolling acoustic transducer according to claim 1 wherein said lubricant is petroleum jelly.

3. A rolling acoustic transducer according to claim 1 wherein said lubricant is castor oil.

4. A rolling acoustic transducer according to claim 1 wherein said body is a substantially cylindrical disk positioned to rotate at a particular point along the longitudinal axis of said axle between a pair of flanges, said hollow axle being formed of non-metallic plastic such as polyvinyl chloride.

5. A rolling acoustic transducer according to claim 4 wherein said elastomeric material of said disk is a silastic and wherein said disk has an outside diameter in the range from about 6 inches (9 cm) to about 15 inches (38 cm) and an axial length from about 2 inches (5 cm) to about 5 inches (7.5 cm).

6. A rolling acoustic transducer according to claim 4 wherein said disk is made of silicone polymer elastomer.

7. A rolling acoustic transducer according to claim 1 wherein said pickup mounted within said axle includes a pre-amplifier.

8. A rolling acoustic transducer according to claim 1 wherein said elastomeric body includes a first and a second rotatable disk and wherein said piezoelectric pickup produces a signal respective to each said rotatable disk.

9. A rolling acoustic transducer according to claim 8 wherein said signal is differentially amplified.

* * * * *